(12) United States Patent
Vikman et al.

(10) Patent No.: US 10,720,808 B2
(45) Date of Patent: Jul. 21, 2020

(54) METHOD OF MAKING A PERMANENT MAGNET ROTOR

(71) Applicant: Ingersoll-Rand Company, Davidson, NC (US)

(72) Inventors: Esa H. Vikman, Espoo (FI); Petri Juhani Maki-Ontto, Espoo (FI); Fredrik Andreas Boxberg, Espoo (FI)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 459 days.

(21) Appl. No.: 14/949,003

(22) Filed: Nov. 23, 2015

(65) Prior Publication Data

US 2017/0149296 A1   May 25, 2017

(51) Int. Cl.
*H02K 15/02* (2006.01)
*H02K 1/27* (2006.01)
*H02K 15/03* (2006.01)
*H02K 1/28* (2006.01)

(52) U.S. Cl.
CPC ............ *H02K 1/278* (2013.01); *H02K 1/28* (2013.01); *H02K 15/03* (2013.01); *Y10T 29/49012* (2015.01)

(58) Field of Classification Search
CPC ..... B21D 28/12; B23Q 3/155; Y10T 29/5168; Y10T 29/49012; Y10T 29/53143; Y10T 29/53652; H02K 15/03; H02K 1/278; H02K 1/28; H02K 15/02; F04D 29/053
USPC .............. 29/598, 596, 602.1, 604, 607, 609
See application file for complete search history.

(56) References Cited

U.S. PATENT DOCUMENTS

| | | | |
|---|---|---|---|
| 5,140,210 A | 8/1992 | Shirakawa | |
| 5,581,140 A | 12/1996 | Futami et al. | |
| 6,141,856 A * | 11/2000 | Johnson | H02K 1/2733 29/598 |
| 7,872,388 B2 | 1/2011 | Evans et al. | |
| 2002/0079770 A1 | 6/2002 | Lai et al. | |
| 2006/0138894 A1 | 6/2006 | Harada et al. | |
| 2009/0102304 A1 | 4/2009 | Yamamura et al. | |
| 2010/0209872 A1 | 8/2010 | Kuhn et al. | |
| 2013/0009494 A1 | 1/2013 | Oguma | |
| 2016/0049845 A1* | 2/2016 | Gove | H02K 7/003 310/75 R |

FOREIGN PATENT DOCUMENTS

| | | |
|---|---|---|
| CN | 1088364 A | 6/1994 |
| CN | 102790454 A | 11/2012 |
| EP | 1533883 A1 | 5/2005 |
| FR | 2707813 A1 | 1/1995 |

(Continued)

OTHER PUBLICATIONS

Extended European Search Report, European Patent Application No. 16199320.9, dated Apr. 7, 2017, 13 pages.

(Continued)

*Primary Examiner* — Thiem D Phan
(74) *Attorney, Agent, or Firm* — Taft Stettinius & Hollister LLP

(57) ABSTRACT

A method of making a permanent magnet rotor includes interference fitting pressure tools into bores in a rotor core as to deform material of the rotor core outwardly to bias permanent magnets mounted thereon in a radially outward direction against a fixation sleeve.

8 Claims, 3 Drawing Sheets

(56) References Cited

FOREIGN PATENT DOCUMENTS

| JP | H0678482 A | 3/1994 |
|---|---|---|
| JP | 6212359 B2 | 10/2017 |
| WO | 2007004009 A2 | 1/2007 |

OTHER PUBLICATIONS

National Intellectual Property Administration, P.R. China, First Office Action in corresponding application No. 201611029105.5, dated Nov. 5, 2019, 17 pp.
National Intellectual Property Administration, P.R. China, Search Report in corresponding application No. 201611029105.5, dated Oct. 28, 2019, 6 pp.

* cited by examiner

METHOD OF MAKING A PERMANENT MAGNET ROTOR

TECHNICAL FIELD

The present disclosure relates generally to permanent magnet rotors of a type used in electrical machines, and relates more particularly to deforming material of a rotor core so as to bias permanent magnets positioned upon the rotor core against a fixation sleeve.

BACKGROUND

A great many different construction methods and materials are used in connection with rotating machinery such as electrical generators and electrical motors. Rotating components or "rotors" used in such electrical machines commonly employ a number of different parts. During rotation, inertial forces can impart a tendency for rotor components to migrate from intended positions and potentially fail if unconstrained. For relatively low speed applications, simple component retention techniques such as adhesives can suffice. For higher speed applications, mechanical clamping components, retention sleeves and the like can be used. Known strategies have certain shortcomings in at least certain applications.

SUMMARY

In one aspect, making a permanent magnet rotor includes positioning a fixation sleeve about a rotor core having a plurality of permanent magnets. A plurality of pressure tools are then fitted into bores extending through a rotor core of the assembly, to deform material of the rotor core. Deformation of the material urges the magnets in a radially outward direction against the fixation sleeve to bias the magnets against the fixation sleeve.

DETAILED DESCRIPTION

Figure 1:
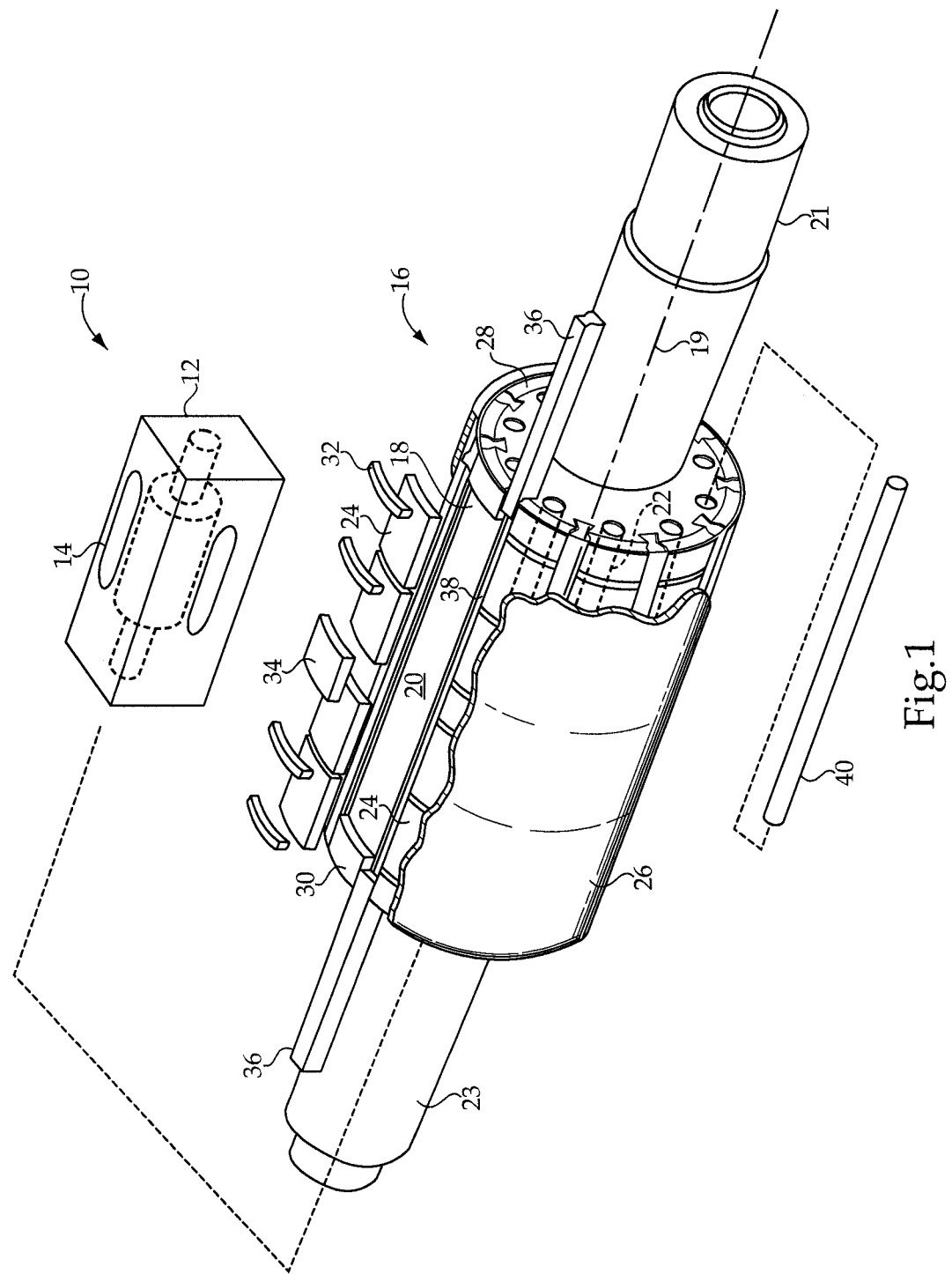
FIG. 1 is a partially disassembled cutaway view of a permanent magnet rotor assembly in an electrical machine, according to one embodiment.

For the purposes of promoting an understanding of the principles of the PERMANENT MAGNET ROTOR AND METHOD OF MAKING SAME, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, there is shown an electrical machine system 10, such as an electrical generator or an electrical motor. Machine system 10 may include a housing 12 wherein a stator 14 is positioned. A rotor 16 is positionable within housing 12 and rotatable to generate electrical current in windings of stator 14, or potentially induced to rotate by way of electrical current supplied to stator 14 from an electrical power source such as an electrical power grid. In a practical implementation strategy, rotor 16 may be a relatively high speed rotor commonly having a speed range up to about 200 meters per second at its outermost surfaces, or potentially still greater. Those skilled in the art will be familiar with the relatively high inertial forces at relatively high speeds of rotor rotation. At such speeds, the tendency for components of a rotating rotor, commonly permanent magnets, to be flung outwardly from a rotor core can result in an air gap forming between the rotor core and the permanent magnets, potentially leading to damage or failure in response to fatigue stresses over time, or even to instantaneous and catastrophic failure. As will be further apparent from the following description, rotors according to the present disclosure are uniquely configured for maintaining structural integrity even at high rotational speeds.

Rotor 16 includes a rotor core 18 defining a longitudinal axis 19, and a rotor core outer surface 20 that extends axially between a first shaft end 21 and a second shaft end 23. Shaft ends 21 and 23 could be structures formed integrally with rotor core 18, but can also be separate pieces attached to rotor core 18 such as by welding. Outer surface 20 may have a non-uniform contour, defining various features employed in mounting and retaining other components of rotor 16 as further discussed herein.

Rotor core 18 further includes a plurality of bores 22 extending therethrough. A plurality of permanent magnets 24 are mounted upon rotor core outer surface 20. An end cap 28 and a second end cap 30 are positioned at opposite axial ends of a plurality of longitudinal rows of permanent magnets 24 in a practical implementation strategy. Spacers 32 and 34 may be positioned axially between adjacent permanent magnets 24 upon outer surface 20. A plurality of magnet retention elements 36 in the form of elongate rods may be positioned within grooves 38 formed by outer surface 20. In the illustrated embodiment, elements 36 have a cross section generally similar to an hourglass, although no particular geometry is required. In some embodiments, devices to cancel or suppress eddy currents might also be used in rotor 16.

Rotor 16 may further include a fixation sleeve 26 positioned about rotor core 18 and magnets 24, such that magnets 24 are in contact with fixation sleeve 26. In the FIG. 1 illustration, sleeve 26 is shown partially in cutaway to illustrate additional features of rotor 16, however, it will be appreciated that sleeve 26 will typically extend axially at least as long as necessary to cover and constrain all of the magnets 24 and their associated mounting, retention and positioning hardware. Rotor 16 also includes a plurality of pressure tools 40 fitted within bores 22 such as by interference fitting, and deforming material of rotor core 18 such that the plurality of permanent magnets 24 are urged radially outwardly and biased by way of the deformation against fixation sleeve 26. While pressure tools will typically remain resident within rotor core 18, in other embodiments they might serve the purposes of material deformation and biasing, and then be removed. Pressure tools 40 might or might not have shapes complementary to shapes of bores 22, and pressure tools 40 could themselves be deformed by way of the interference fitting.

As noted above, magnets 24 may be positioned in a plurality of longitudinal rows at a plurality of circumferential locations about longitudinal rotor axis 19. Grooves 38 may be positioned in an alternating arrangement with the plurality of longitudinal rows of magnets 24. It can also be seen from FIG. 1 and figures attached but yet to be described that magnet retention rods 36 may be shaped so as to circumferentially overlap edges of each of magnets 24 in adjacent ones of the longitudinal rows.

Figure 2:
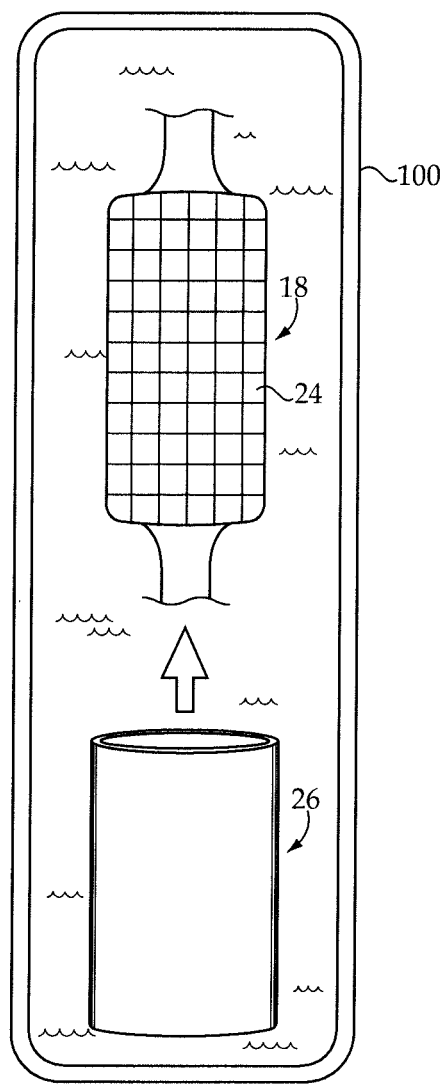
FIG. 2 is a diagrammatic view of one part in a process, according to one embodiment.

Referring also now to FIG. 2, there is shown rotor core 18 and fixation sleeve 26 disassembled and shown as they might appear placed within a liquid nitrogen bath 100. Those skilled in the art will be familiar with shrinking of materials commonly used in permanent magnet rotor construction when reduced in temperature. Certain other materials, one example of which is the carbon fiber material of which fixation sleeve 26 may be constructed, can actually expand when cooled. Placing rotor core 18 and fixation sleeve 26 in bath 100 enables rotor core 18 to shrink and fixation sleeve 26 to expand, so that when fixation sleeve 26 is positioned about rotor core 18 and the components returned to a higher temperature sleeve 26 is shrink fitted about rotor core 18 and magnets 24. Accordingly, shrink fitting fixation sleeve 26 in the manner described, or in another suitable manner, will tend to result in contact with magnets 24 and also produces contact pressure that squeezes magnets 24 radially inward against outer rotor core surface 20. This contact pressure has been demonstrated to be effective in extending the speed range for a permanent magnet rotor, such that the permanent magnets are not flung outwardly by inertial forces to create an air gap between the magnets and the rotor core at moderately high speeds. It has also been discovered, however, that as speeds increase still further the aforementioned shrink fitting process is not sufficient to keep the permanent magnets from separating from the rotor core. Those skilled in the art will appreciate the practical obstacles to further cooling of parts to be shrink fitted beyond the use of liquid nitrogen as described. Accordingly, the present disclosure can be understood as providing an extension of the speed range of a permanent magnet rotor by providing for an additional mechanism of biasing the permanent magnets against the fixation sleeve as described herein.

Figure 3:
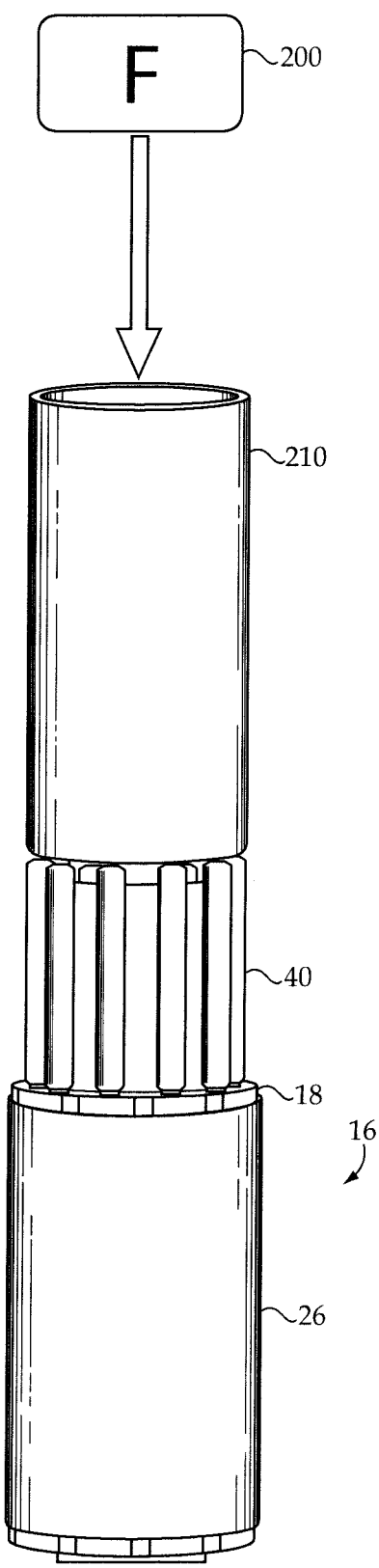
FIG. 3 is a diagrammatic view of another part in a process, according to one embodiment.

To this end, now in reference to FIG. 3, there is shown a force producing device 200 and pressing tool 210 in the nature of a hollow cylinder as it might appear contacting pressure tools 40 for pushing pressure tools 40 into rotor core 18. In the illustrated embodiment, pressure tools 40 have the form of cylindrical rods, however, it should be appreciated that in other instances pressure tools 40 might have a different cross sectional shape, might not be uniformly distributed circumferentially about rotor core 18, or might even be multiple pieces or expandable devices that remain within rotor core 18 or are removable. Accordingly, in the present context the term pressure tool should be given a meaning broader than merely a simple rod, shaft or the like.

Figure 4:
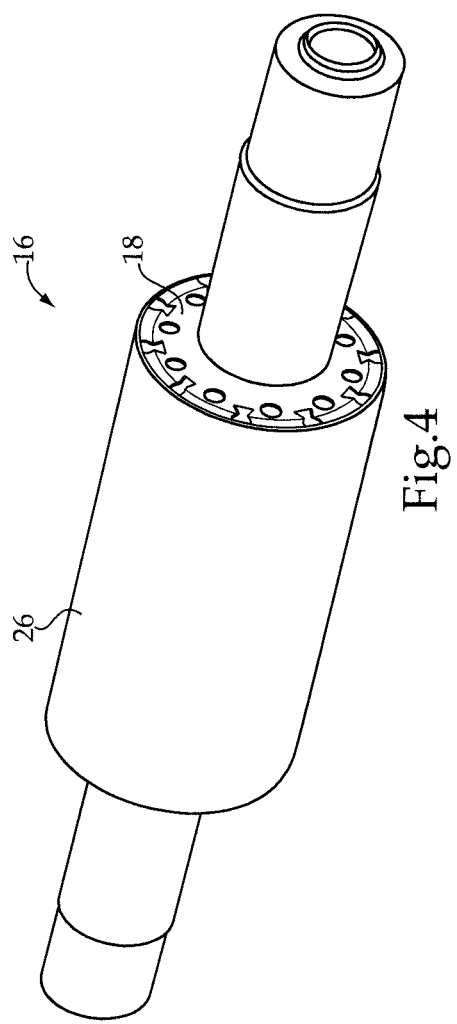
FIG. 4 is a diagrammatic view of a rotor assembly, according to one embodiment.
Figure 5:
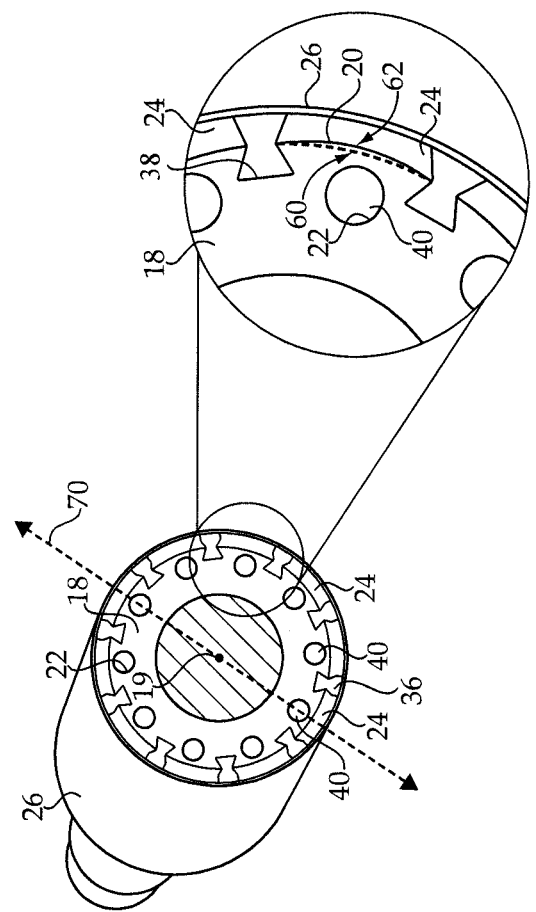
FIG. 5 is a partially sectioned diagrammatic view, in perspective, of a rotor assembly according to one embodiment, and including a detailed enlargement.

Referring now to FIG. 4, there is shown rotor 16 as it might appear fully assembled and ready for installation into housing 12. In addition to fixation sleeve 26 positioned about rotor core 18, rotor 16 may be equipped with bearings, bushings, or other hardware commonly positioned about a rotor shaft for supporting and journaling rotor 16. Referring also to FIG. 5, there is shown a diagrammatic view of rotor core 18 showing fixation sleeve 26 extending circumferentially about magnets 24 upon rotor core 18, and also including a detailed enlargement. With reference to the detailed enlargement, there can be seen a phantom line 60, just adjacent to a solid line 62 that represents the radially outermost point of outer surface 20. It will be recalled that some deformation of material of rotor core 18 will occur in response to fitting of pressure tools 40 into bores 22. Phantom line 60 represents generally one circumferential profile that might be observed prior to press fitting tools 40 into core 18, whereas the solid line shown via reference numeral 62 represents an example outwardly deformed profile that results from the interference fitting. It should be appreciated that the material deformation would likely not be visible to the unaided eye, but as is the case with all interference fits by definition some dimensional change can be expected to occur and is indeed desirable to achieve the biasing of magnets 24.

In the illustrated embodiment, each of bores 22 is intersected, typically at their center axis, by a line segment 70 as shown in FIG. 5 that extends from longitudinal rotor axis 19 to a different one of the plurality of circumferential locations. Another way to understand this design principle is that magnets 24 and bores 22 are generally in circumferential alignment. Alternatives are nevertheless contemplated where bores 22 are not in circumferential alignment with magnets 24, but instead are offset to a relatively greater or relatively lesser extent, to obtain desirable results of the material deformation occurring responsive to the interference fitting of tools 40. It can also be seen that grooves 38 extend relatively more deeply into rotor core 18 in a radially inward direction than an outermost extent of bores 22. Stated another way, bores 22 and grooves 38 have partially radially overlapping extents. In other instances, bores 22 might be positioned relatively radially further outward or radially inward. It can also be understood from the present description that deformed material of rotor core 18 may be in a first state of compression, such as a higher state of compression, and in an alternating arrangement with material of rotor core 18 that is in a second, lesser state of compression. The relatively greater state of compression may reside in material that is radially between each magnet 24 and the corresponding bore 22, whereas material at the lesser state of compression may be adjacent, such as the material within which adjacent grooves 22 are located. While some plastic deformation of material of rotor core 18 may occur, the deformation may be at least partially elastic such that the increased contact pressure and biasing of magnets 24 against fixation sleeve 26 can be sustained over time and through a range of operating conditions.

The present description is for illustrative purposes only, and should not be construed to narrow the breadth of the present disclosure in any way. Thus, those skilled in the art will appreciate that various modifications might be made to the presently disclosure embodiments without departing from the full and fair scope and spirit of the present disclosure. For instance, while one example geometry respecting the permanent magnets, and the shape of the outer surface of the rotor core is discussed above and shown in the drawings, the present disclosure is not thereby limited. Rather than longitudinal magnet retention rods or the like the permanent magnets could be mounted directly on the surface of the rotor core and physically constrained solely by the retention sleeve, with preloading and biasing of the permanent magnets being achieved by way of pressure tools as discussed above. Other aspects, features and advantages will be apparent upon an examination of the attached drawings and appended claims.

What is claimed is:

1. A method of making a permanent magnet rotor comprising:

positioning a fixation sleeve about a rotor core assembly having a plurality of permanent magnets mounted upon a rotor core defining a longitudinal axis;

fitting a plurality of pressure tools into a plurality of bores extending through the rotor core; and deforming material of the rotor core via the pressure tools so as to bias the plurality of permanent magnets in a radially outward direction against the fixation sleeve.

2. The method of claim 1 wherein the positioning includes shrink fitting the fixation sleeve about the rotor core assembly so as to apply a contact pressure between the fixation sleeve and the plurality of permanent magnets, and such that the bias produced via the deforming of material is in addition to the contact pressure.

3. The method of claim 2 wherein the positioning of the fixation sleeve includes positioning a cylindrical carbon fiber fixation sleeve.

4. The method of claim 1 wherein the plurality of permanent magnets are mounted at a plurality of circumferential locations about the longitudinal axis, and the plurality of bores are located one between each of the plurality of circumferential locations and the longitudinal axis.

5. The method of claim 4 wherein the plurality of permanent magnets are arranged in a plurality of longitudinal rows each located at one of the plurality of circumferential locations.

6. The method of claim 1 wherein the fitting includes interference fitting a plurality of rods comprising the plurality of pressure tools.

7. The method of claim 6 wherein the fitting includes interference fitting a plurality of cylindrical rods comprising the plurality of pressure tools.

8. The method of claim 6 wherein the positioning includes shrink fitting the fixation sleeve about the rotor core assembly, and the fitting includes simultaneously press fitting the plurality of rods into the plurality of bores.

\* \* \* \* \*